United States Patent
Shen et al.

(10) Patent No.: US 10,440,405 B2
(45) Date of Patent: Oct. 8, 2019

(54) CONTENT DELIVERY DEVICE FOR STREAMING CONTENT

(71) Applicant: Verizon Patent and Licensing Inc., Arlington, VA (US)

(72) Inventors: Kevin Shen, Sunnyvale, CA (US); Suri B Medapati, San Jose, CA (US); Leslie H. Francis, Saratoga, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/848,767

(22) Filed: Dec. 20, 2017

(65) Prior Publication Data
US 2019/0191189 A1    Jun. 20, 2019

(51) Int. Cl.
| H04N 21/234 | (2011.01) |
| H04N 19/10 | (2014.01) |
| H04L 9/08 | (2006.01) |
| H04L 29/08 | (2006.01) |

(52) U.S. Cl.
CPC ............. *H04N 21/234* (2013.01); *H04L 9/08* (2013.01); *H04L 67/02* (2013.01); *H04L 67/06* (2013.01); *H04N 19/10* (2014.11)

(58) Field of Classification Search
CPC ......... H04N 21/234; H04N 19/10; H04L 9/08
See application file for complete search history.

(56) References Cited

U.S. PATENT DOCUMENTS

| 2010/0070608 A1* | 3/2010 | Hosur ................ H04N 21/235 709/218 |
| 2012/0265853 A1* | 10/2012 | Knox ................ H04N 21/2187 709/218 |
| 2012/0290688 A1* | 11/2012 | Nandakumar ..... H04N 21/2387 709/219 |
| 2013/0117352 A1* | 5/2013 | Chen ................ H04N 21/2405 709/203 |
| 2014/0208374 A1* | 7/2014 | Delaunay ........... H04N 21/2343 725/109 |
| 2014/0229976 A1* | 8/2014 | Ma ....................... H04N 21/231 725/32 |
| 2014/0281009 A1* | 9/2014 | Moorthy .......... H04N 21/26258 709/231 |
| 2014/0282766 A1* | 9/2014 | Good ................ H04N 21/2225 725/93 |
| 2016/0182466 A1* | 6/2016 | Wagenaar ........... H04L 63/0457 713/154 |

* cited by examiner

*Primary Examiner* — Randy A Flynn (57) ABSTRACT

A device can receive, from a user device, a request for content in a target format for playback. The device can determine information identifying the content in a source format based on the request for content associated with the target format. The device can request the content in the source format using the information identifying the content in the source format. The device can receive the content from a content source in the source format based on requesting the content in the source format. The device can convert the content in the source format to generate a set of files associated with the target format. The device can provide the set of files in the target format to a content delivery network associated with the user device.

20 Claims, 5 Drawing Sheets

CONTENT DELIVERY DEVICE FOR STREAMING CONTENT

BACKGROUND

A server device can provide content to a user device using adaptive bit rate streaming. For example, the server device can detect a bandwidth, a processing capability, a buffering capability, and/or the like for a connection between the server device and the user device, and can dynamically select between multiple available bit rates to provide streaming content to the user device. Alternatively, the user device can select a bit rate for the streaming content, and can provide a request to the server device to cause the server device to provide the streaming content with the selected bit rate. Some content can be associated with digital rights management restrictions. For example, the content can be encrypted using an encryption key, and the server device or the user device can obtain the encryption key to decrypt the content for playback.

DETAILED DESCRIPTION OF PREFERRED EMBODIMENTS

The following detailed description of example implementations refers to the accompanying drawings. The same reference numbers in different drawings can identify the same or similar elements.

A content delivery network can include a server device that provides content. The server device can be associated with an encoder that receives streaming content at a first bit rate, and can provide the streaming content at one or more second, lesser bit rates. A user device can communicate with the server device to obtain the content from the server device at a bit rate selected based on a network characteristic, a device characteristic, and/or the like. The server device can provide the content using a selected bit rate and using a particular communication protocol for streaming content. However, different user devices accessing a common content delivery network can be associated with using different communication protocols for streaming content. For example, a first user device, such as an Android operating system (OS)-type user device, can be associated with receiving content provided using a first communication protocol (e.g., moving picture experts group (MPEG)-dynamic adaptive streaming over HTTP (MPEG-DASH) and a second user device, such as an iOS-type user device, can be associated with receiving content provided using a second streaming communication protocol (e.g., hypertext transfer protocol (HTTP) live streaming (HLS)).

Some implementations, described herein, can enable converting of video files and audio files to enable streaming content to be provided to a user device. For example, a content delivery device can convert MPEG-DASH video files and audio files into HLS-compatible transport stream files. Moreover, the content delivery device can generate an HLS-type of manifest for the transport stream files based on information included in an MPEG-DASH manifest associated with the video files and audio files. In this way, the content delivery device reduces a utilization of network resources relative to requiring communication with a content server providing the video files and audio files to obtain information to generate the HLS-type of manifest. Furthermore, the content delivery device can enable decryption and encryption of the video files and audio files to maintain digital rights management protections for the transport stream files. In this way, the content delivery device ensures improved availability of streaming content, reduces utilization of network resources and computing resources by a content source device, such as a server, relative to providing multiple content streaming sources for multiple communications protocols, and/or the like.

Figure 1A:
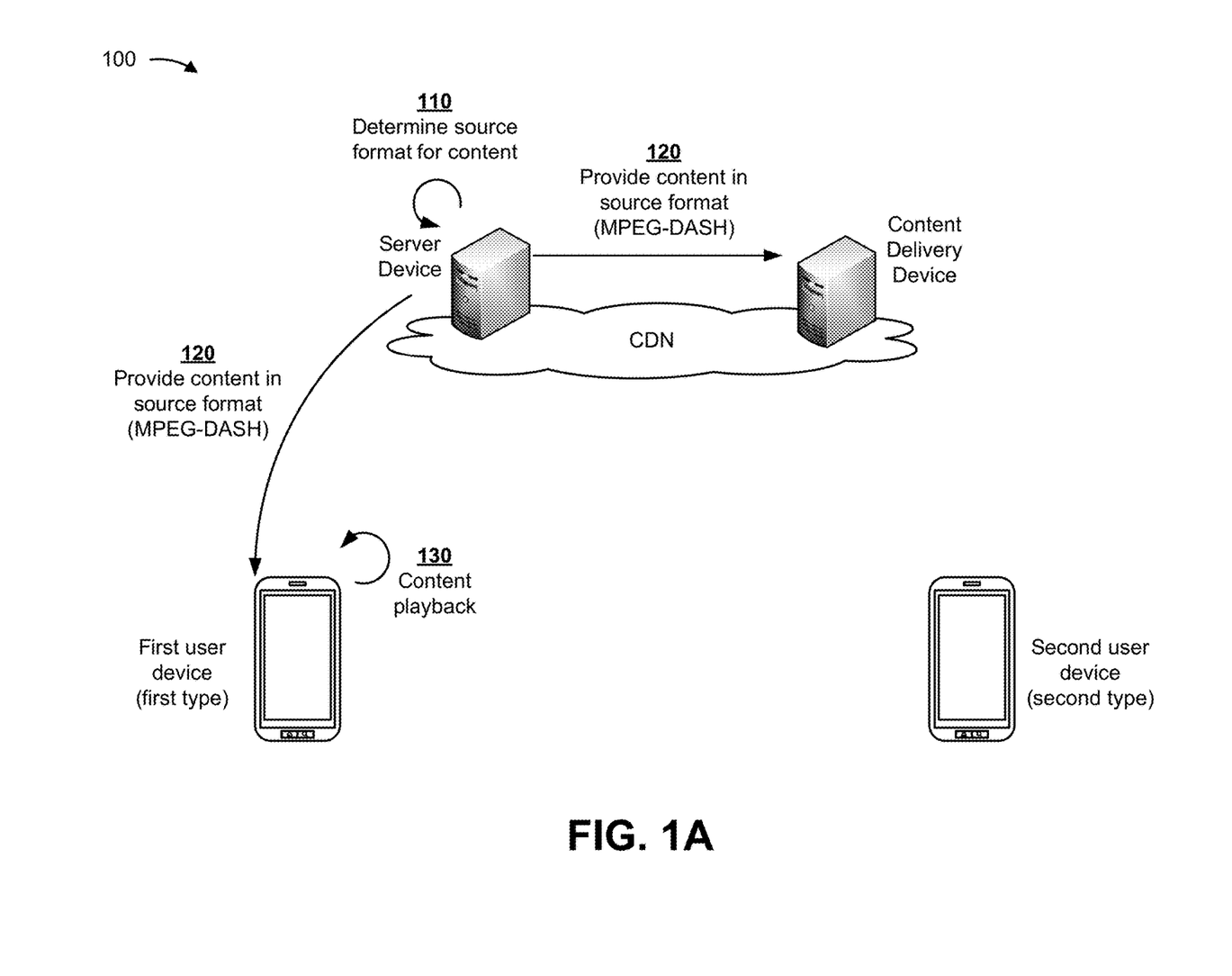
FIGS. 1A and 1B are diagrams of an overview of an example implementation described herein.
Figure 1B:
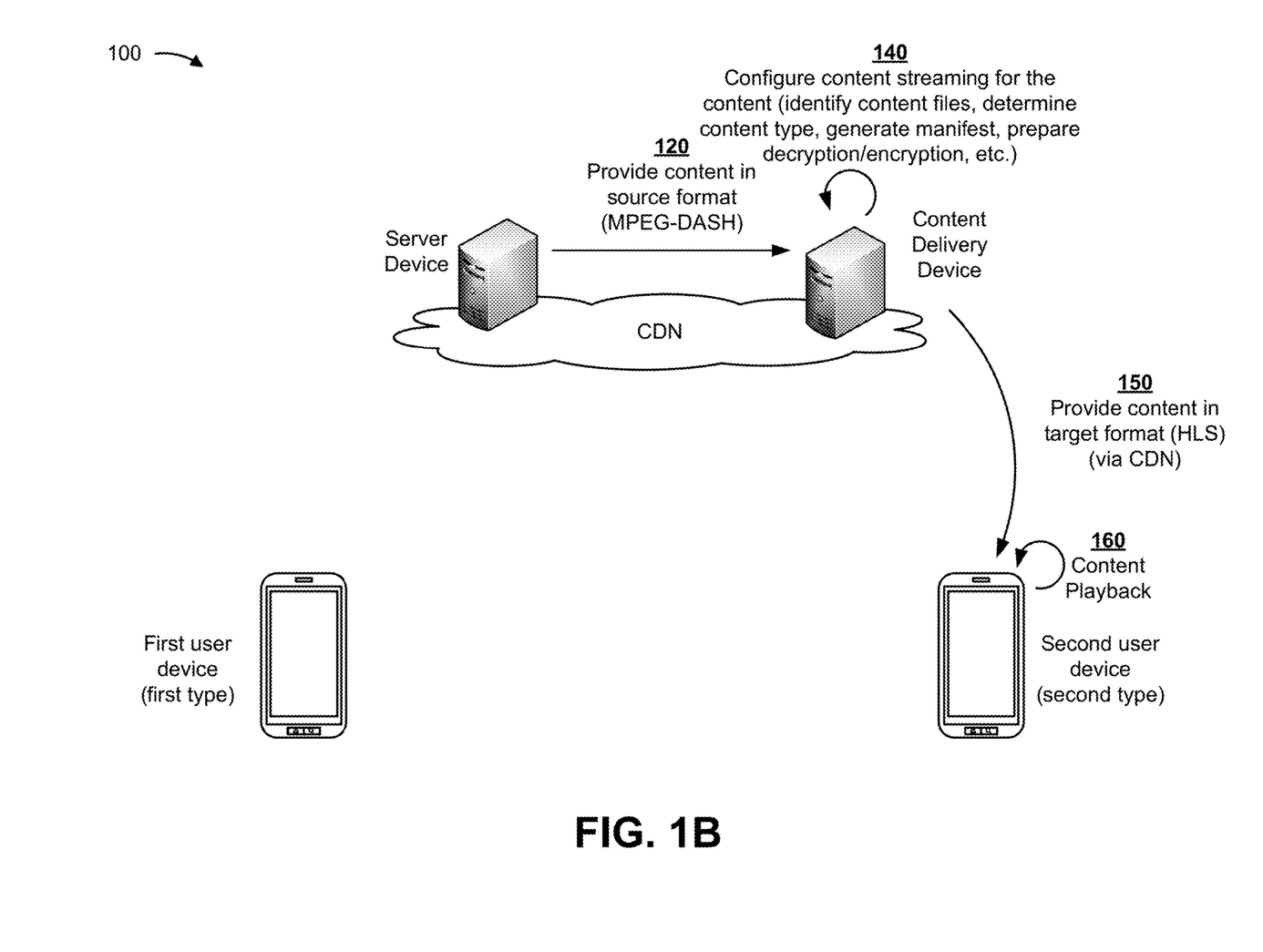

FIGS. 1A and 1B are diagrams of an overview of an example implementation 100 described herein. As shown in FIG. 1A, example implementation 100 includes a first type of user device (e.g., associated with using, for example, MPEG-DASH), a second type of user device (e.g., associated with using, for example, HLS), and a content delivery network (CDN), which can include a server device and a content delivery device. Additionally, or alternatively, one or more devices described as being included in the content delivery network can be located outside of or can operate without a content delivery network. For example, the content delivery device can be a set-top box providing recorded content outside of a content delivery network or a content server providing a video-on-demand type of content or a live streaming type of content from a content delivery network. Although some implementations, described herein, are described in terms of video content, other types of content are also possible, such as audio content, virtual reality content, and/or the like.

As further shown in FIG. 1A, and by reference number 110, the server device can determine a first type of format for content that is to be provided to the first user device. For example, based on a request from the first user device to an edge node of the CDN, the server device can determine to provide MPEG-DASH streaming content. As shown by reference number 120, the server device can provide the content in the source format to the first user device, and to the content delivery device. For example, the server device can provide the content in an MPEG-DASH format. In some implementations, the server device may provide the content based on a request from the content delivery device for the content in the source format and based on the content delivery device receiving a request for the content in the target format from the second user device (e.g., provided to an edge node of the CDN) and determining information identifying the content in the source format based on the request. As shown by reference number 130, based on the server device providing the content in the source format, the first user device can perform content playback. In this way, a first user device associated with a first type can provide content playback for streaming content from a content delivery network.

As shown in FIG. 1B, and by reference number 140, the content delivery device can configure content streaming for the content based on receiving the content in the source format. For example, the content delivery device can identify content files associated with the content, determine a content type (e.g., video-on-demand, which can be associated with a static content start time and a static content end time for a stream, live streaming, which is not be associated with a static content start time and a static content end time for a stream, and/or the like). Additionally, or alternatively, the content delivery device can generate a manifest for the content. Additionally, or alternatively, the content delivery device can convert an audio stream and a video stream of the content. For example, the content delivery device can transform the MPEG-DASH audio and video into raw audio and video, and can multiplex the raw audio and video into a single HLS format file. Additionally, or alternatively, the content delivery device can prepare encryption and/or decryption for the content.

As further shown in FIG. 1B, and by reference number 150, the content delivery device can provide the content in the target format to the second user device. For example, the content delivery device can provide the content in an HLS format. Additionally, or alternatively, the content delivery device can provide a manifest file associated with the HLS format to enable the second user device to request files of the streaming content, decryption information to enable the second user device to perform decryption on the streaming content, and/or the like. In some implementations, based on providing the manifest file, the second user device can communication with the content delivery device to request files of the streaming content, which can cause the content delivery device to convert the audio files and video files of the streaming content and provide a transport stream of the content. As shown by reference number 160, based on the content delivery device providing the content in the target format, the second user device can perform content playback.

In this way, the content delivery device ensures that the second user device an access the content without multiple server devices being used to provide multiple stream formats. In this way, the content delivery device can reduce utilization of network resources, utilization of computing resources, cost, and/or the like relative to utilizing multiple server devices for the multiple stream formats. Moreover, the content delivery device decrypts MPEG-DASH encrypted content and encrypts the content as HLS encrypted content, thereby enabling the second user device to decrypt the content and enabling end-to-end digital rights management for the content.

As indicated above, FIGS. 1A and 1B are provided merely as an example. Other examples are possible and can differ from what was described with regard to FIGS. 1A and 1B.

Figure 2:
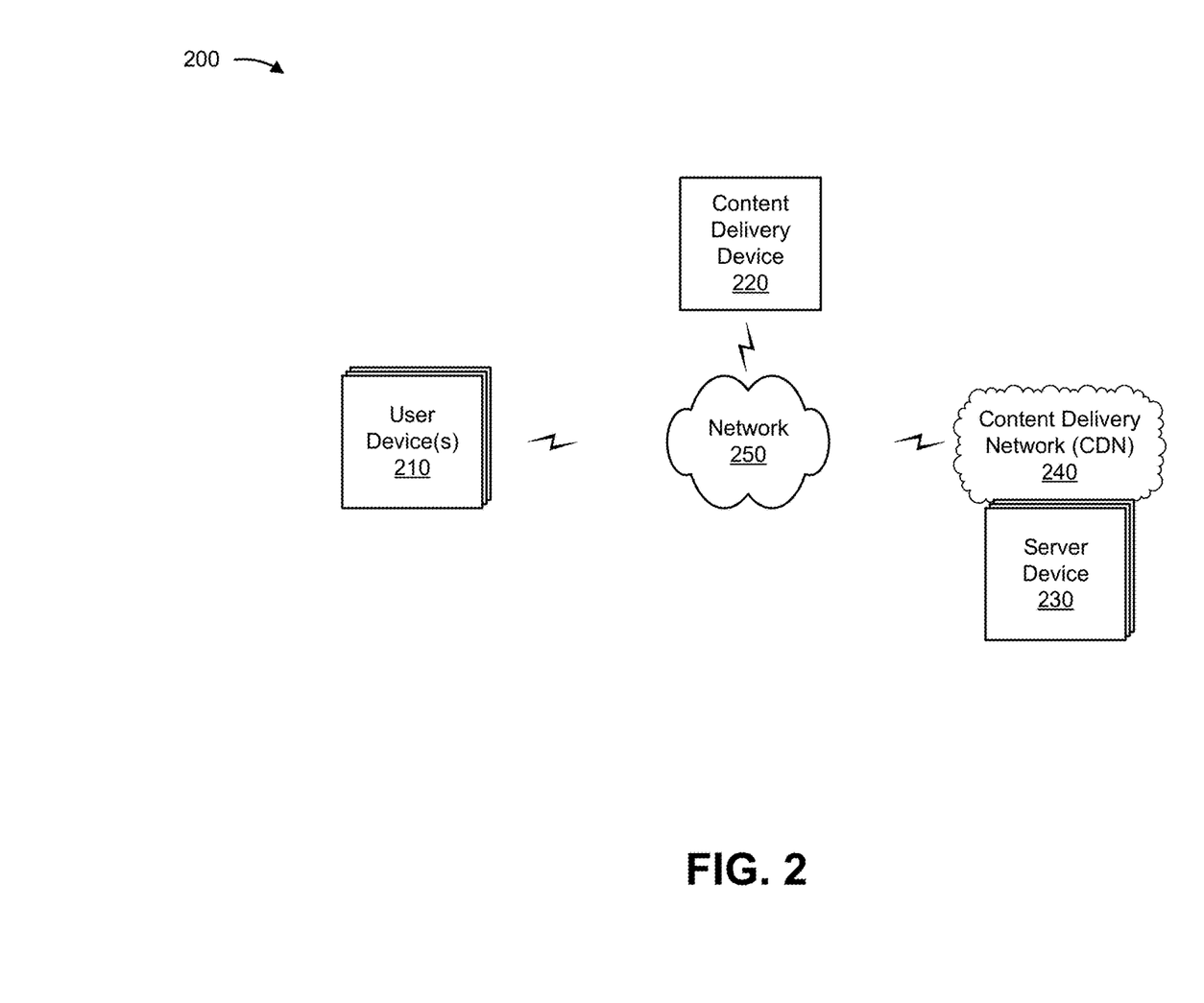
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include one or more user device(s) 210, a content delivery device 220, one or more server device(s) 230, a content delivery network (CDN) 240, and a network 250. Devices of environment 200 can interconnect via wired connections, wireless connections, or a combination of wired and wireless connections.

User device 210 includes one or more devices capable of receiving, generating, storing, processing, and/or providing information associated with content for playback. For example, user device 210 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 can be associated with a first type. For example, user device 210 can be an Android-OS type of user device 210 that can decrypt MPEG-DASH content. Alternatively, user device 210 can be associated with a second type, such as an iOS type of user device 210 that can decrypt HLS content.

Content delivery device 220 includes one or more devices capable of receiving, generating, storing, processing, and/or providing information associated with content for playback. For example, content delivery device 220 can include a content server, a set-top box, a computer, a user device, or a similar type of device. In some implementations, content delivery device 220 can be included in content delivery network 240. In some implementations, content delivery device 220 is not included in content delivery network 240, and can communicate with server devices 230 of content delivery network 240 via network 250. In some implementations, content delivery device 220 can include an encoder module for encoding content, a decryption module for decrypting content, an encryption module for encrypting content, a key storage module for storing an encryption/decryption key, and/or the like.

Server device 230 includes one or more devices capable of storing, processing, and/or routing information associated with providing content. For example, server device 230 can include a server that provides streaming video content, such as video-on-demand content, live streaming content, and/or the like. In some implementations, server device 230 can include a content server that stores content for playback. In some implementations, server device 230 can be associated with providing adaptive bit rate streaming using an MPEG-DASH format. In some implementations, server device 230 can include a communication interface that allows server device 230 to receive information from and/or transmit information to other devices in environment 200.

CDN 240 includes one or more wired and/or wireless networks. In some implementations, CDN 240 can include a distributed system of server devices 230 (e.g., in one or more data centers) to receive content (e.g., from a content provider) and/or to provide the content for distribution (e.g., to user device 210). For example, CDN 240 can include a cellular network (e.g., a long-term evolution (LTE) network, a code division multiple access (CDMA) network, a 3G network, a 4G network, a 5G network, another type of cellular network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Network 250 includes one or more wired and/or wireless networks. For example, network 250 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
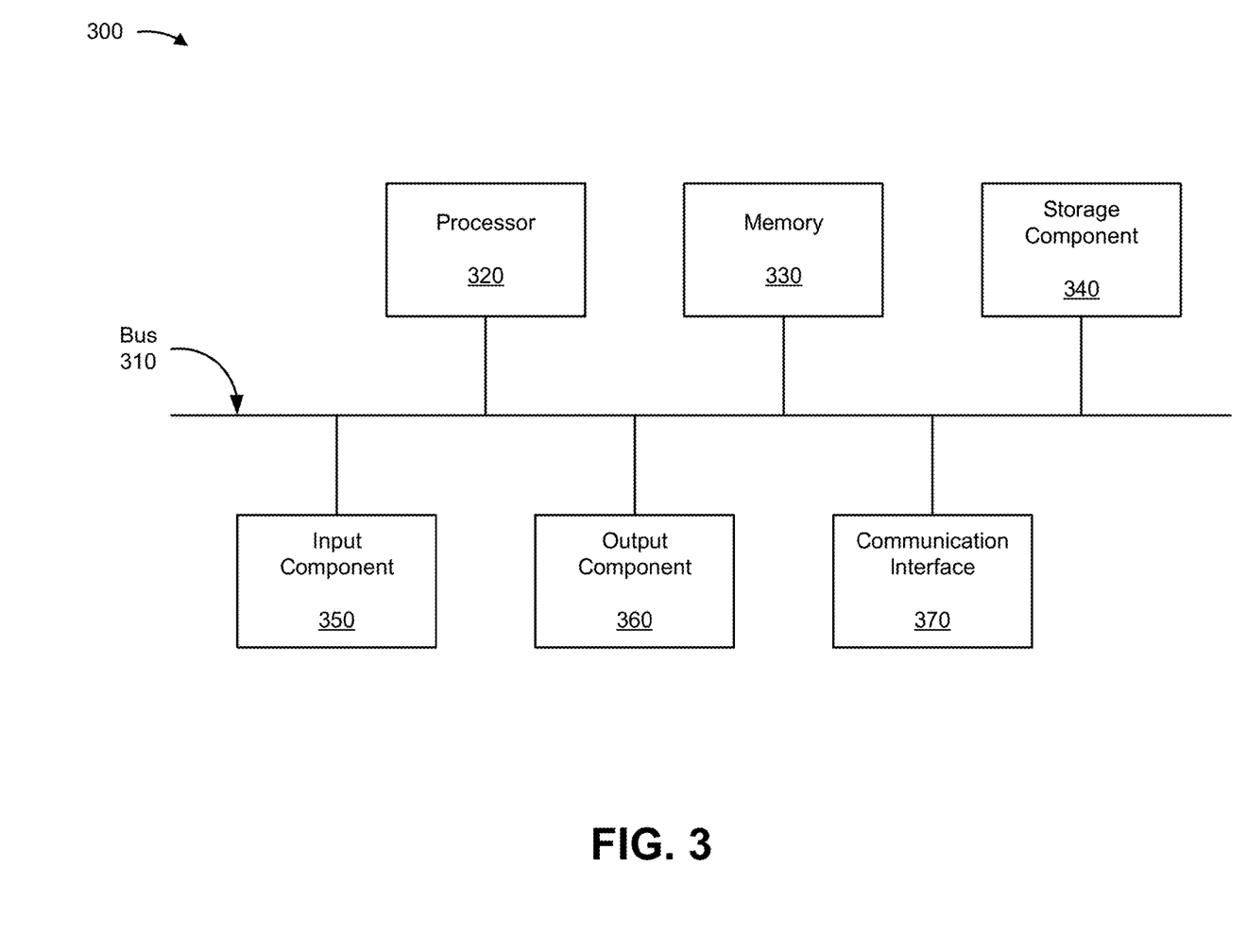
FIG. 3 is a diagram of example components of one or more devices of FIG. 2.

FIG. 3 is a diagram of example components of a device 300. Device 300 can correspond user device 210, content delivery device 220, and/or server device 230. In some implementations user device 210, content delivery device 220, and/or server device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
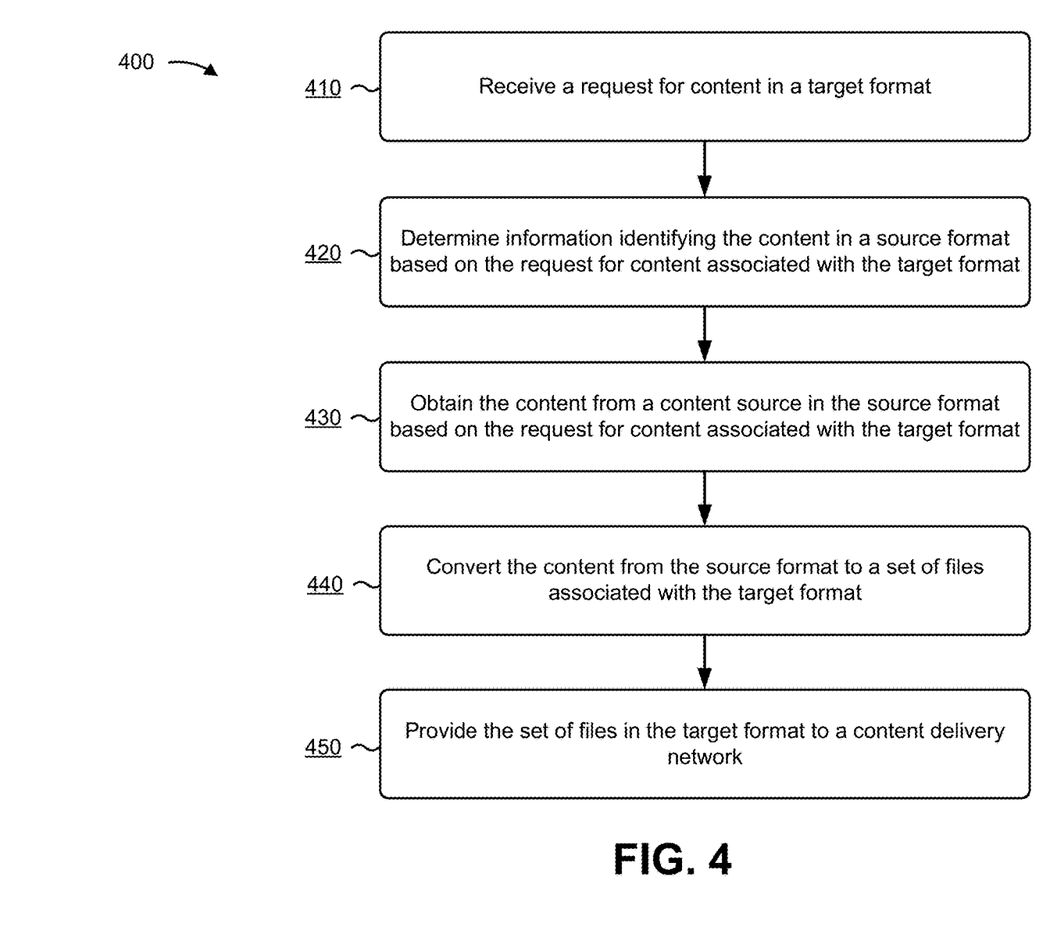
FIG. 4 is a flow chart of an example process for providing streaming content.

FIG. 4 is a flow chart of an example process 400 for providing streaming content. In some implementations, one or more process blocks of FIG. 4 can be performed by content delivery device 220. In some implementations, one or more process blocks of FIG. 4 can be performed by another device or a group of devices separate from or including content delivery device 220, such as user device 210 and server device 230.

As shown in FIG. 4, process 400 can include receiving a request for content in a target format (block 410). For example, content delivery device 220 can identify the content associated with the target format. In some implementations, content delivery device 220 can receive a request for content from a particular source for the content. For example, content delivery device 220 can determine that the content is to be provided from server device 230. In some implementations, content delivery device 220 may receive a request for the content associated with a particular format. For example, user device 210 may transmit a request for an HLS file using an HLS format file name. In this case, user device 210 may parse the HLS format file name to identify a characteristic of the content, and may generate an MPEG-DASH format file name to request the content from server device 230. In some implementations, the content may be non-multiplexed content, such as audio-only content, video-only content, and/or the like. In some implementations, another type of format may be used for the target format, such as non-multiplexed fragmented MPEG-4 (fMP4). Although some implementations, described herein, are described in terms of an MPEG-DASH source format and an HLS target format, other source formats and target formats are possible.

In this way, content delivery device 220 can receive the request for content in the target format.

As further shown in FIG. 4, process 400 can include determining information identifying the content in a source format based on the request for content associated with the target format (block 420). For example, content delivery device 220 can determine information identifying the content in the source format based on the request for content associated with the target format.

In some implementations, content delivery device 220 can identify multiple portions of the content. For example, content delivery device 220 can identify an audio stream (e.g., an MPEG-DASH audio stream) and a video stream (e.g., an MPEG-DASH video stream) associated with the content. Additionally, or alternatively, content delivery device 220 can identify multiple portions of the content associated with multiple time steps, multiple streams of the content associated with multiple bit rates, and/or the like.

In some implementations, content delivery device 220 can identify a type of the content. For example, content delivery device 220 can determine that the content is video-on-demand content. In this case, content delivery device 220 can identify a static start time for the video-on-demand content and a static end time for the video-on-demand content. Additionally, or alternatively, content delivery device 220 can determine that the content is live streaming content, which is not be associated with a static start time or a static end time.

In some implementations, content delivery device 220 can identify the content based on receiving a request associated with a manifest identifier. For example, content delivery device 220 can receive the requested manifest identifier (e.g., an identifier of an MPEG-DASH type manifest or stream (a .mpd file, a .m4a file, a .m4v file, etc.)), and can utilize information included in the requested manifest identifier to identify the content. In this case, the manifest identifier can be associated with a pre-configured format, such that content delivery device 220 can extract content identification information from the manifest identifier based on the pre-configured format. For example, content delivery device 220 can receive a requested manifest identifier that is a string, such as "<video file name>~<audio file name>~<requested bit rate>~<time scale>~<duration> . . . ", which can enable content delivery device 220 to identify a file name for a video stream of the content, a file name for an audio stream of the content, a bit rate with which the content is to be provided, a time scale for the content (e.g., a quantity of units per second of the content), a duration for the content, and/or the like. Additionally, or alternatively, content delivery device 220 can identify the content based on receiving a manifest identifier of an HLS manifest, an identifier of a transport stream file, and/or the like.

In this way, content delivery device 220 can determine information identifying the content in the source format based on the request for content associated with the target format.

As further shown in FIG. 4, process 400 may include obtaining the content from a content source in the source format based on the request for content associated with the target format (block 430). For example, content delivery device 220 may request and receive the content in the source format from content source 230.

In some implementations, content delivery device 220 can request the content based on identifying the content. For example, based on identifying the content, content delivery device 220 can request that server device 230 provide the content to content delivery device 220 to enable content delivery device 220 to convert the content, decrypt and encrypt the content, and/or the like, and to enable content delivery device 220 to provide the content to user device 210.

In some implementations, content delivery device 220 can request a version of the content based on identifying the version of the content. For example, based on receiving a request from user device 210 for an English language audio track for an item of content, content delivery device 220 can request that server device 230 provide the English language audio track for the item of content. In some implementations, content delivery device 220 can request a version of the content based on information identifying available versions of the content. For example, server device 230 can periodically provide information identifying available languages for audio tracks, and content delivery device 220 can provide the information to user device 210 to enable user selection, can automatically select based on a user characteristic (e.g., a user language for billing, a user pre-selected default language, a location of user device 210, and/or the like), and/or the like. In some implementations, content delivery device 220 can select a language from a pre-configured set of available languages, and can alter the pre-configured set of available languages based on information from server device 230 indicating the alteration. In this way, server device 230 does not need to send language information unless there is a change to the pre-configured set of available languages, thereby reducing a utilization of network resources, memory resources, and/or the like.

In some implementations, content delivery device 220 can identify a key associated with the content. For example, content delivery device 220 can determine a key for decryption of the content in the MPEG-DASH format, a key for encryption of the content in a FairPlay encryption format associated with HLS, and/or the like, thereby enabling end-to-end digital rights management for content that is converted from a source format to a target format to enable playback on a user device 210 configured for playback using the target format and not the source format.

In some implementations, content delivery device 220 can obtain the content from server device 230. For example, content delivery device 220 may use information identifying the content (e.g., an MPEG-DASH format file name for the content) to request the content, may receive the content, and may convert the content to the HLS format to provide to user device 210 for playback.

In this way, content delivery device 220 can obtain the content from the content source in the source format based on the request for content associated with the target format.

As further shown in FIG. 4, process 400 can include converting the content from the source format to a set of files associated with the target format (block 440). For example, content delivery device 220 can convert the content.

In some implementations, content delivery device 220 can generate a manifest file to configure content streaming for the content. For example, content delivery device 220 can generate an HLS manifest file (e.g., a .m3u8 type manifest file) based on a requested manifest identifier of an MPEG-DASH manifest file (e.g., a .mpd type manifest file). In this case, based on determining a characteristic of the content in the source format (e.g., a video stream characteristic, an audio stream characteristic, a duration characteristic, a time scale characteristic, etc.), content delivery device 220 can generate one or more HLS manifest files using a pre-configured format to provide information identifying the characteristic of the content.

In some implementations, content delivery device 220 can generate a particular type of HLS manifest file. For example, content delivery device 220 can generate a master playlist file identifying a set of playlist file names for the content. In this case, the master playlist file can include information identifying a resolution, a language, a decryption characteristic, an encryption characteristic, and/or the like. Additionally, or alternatively, content delivery device 220 can generate a media playlist file identifying a set of media files associated with a particular characteristic (e.g., a particular video bandwidth). In this case, the media playlist file can include information identifying a video representation characteristic, a language, an audio representation characteristic, a decryption characteristic, an encryption characteristic, and/or the like.

In some implementations, content delivery device 220 can enable and/or perform decryption and/or encryption for the content to convert the content. For example, content delivery device 220 can decrypt the content from the MPEG-DASH format stream (e.g., decrypt a common encryption scheme (cenc)-type encryption, such as advanced encryption standard-counter mode (AES-CTR)) using one or more determined keys (e.g., static keys, dynamic keys, and/or the like). In some implementations, content delivery device 220 can encrypt the content (e.g., using FairPlay encryption using a key, an initialization vector, and/or the like). In this way, content delivery device 220 can convert the content from a first type of encryption to a second type of encryption.

In some implementations, content delivery device 220 can provide information associated with enabling decryption. For example, content delivery device 220 can provide decryption information, such as a .JSON object including a key identifier (e.g., but not the key identified by the key identifier), an initialization vector, an encryption block location, and/or the like to user device 210 to enable decryption. In some implementations, content delivery device 220 may use FairPlay encryption for the content, and may provide decryption information via a manifest file. In some implementations, the decryption information can be appended to a transport stream file that is provided via HTTP to provide the content to user device 210.

In some implementations, content delivery device 220 can include the decryption information in a manifest file, such as a master manifest file, and can provide the decryption information when providing the manifest file. Additionally, or alternatively, content delivery device 220 can provide the content without encryption, thereby obviating a need to provide decryption information. In this way, content delivery device 220 enables content playback for user device 210 when user device 210 is not compatible with digital rights management encryptions with which the content was provided by server device 230.

In some implementations, content delivery device 220 can convert and combine an MPEG-DASH audio stream and an MPEG-DASH video stream to generate an HLS transport stream (e.g., a .ts type file) including audio and video of the content. In this way, content delivery device 220 prepares the content (e.g., content originally provided for playback on a user device 210 compatible with MPEG-DASH, such as an Android-type user device 210) for playback on a user device 210 compatible with HLS, such as an iOS-type user device 210. In some implementations, content delivery device 220 can identify a content location for inserting other content, and can insert the other content into the content. For example, content delivery device 220 can determine, based on an argument in a file name of the MPEG-DASH format content, a time location to insert an advertisement, can obtain the advertisement, and can automatically insert the advertisement into the content at the time location. In this way, content delivery device 220 enables device-type specific content insertion (e.g., insertion of a first type of advertisement for an Android-OS type of user device 210 and a second type of advertisement for an iOS type of user device 210).

In some implementations, content delivery device 220 can segment the content into multiple files to be provided to user device 210. For example, content delivery device 220 can segment the content based on a pre-configured content segment length, a threshold segment length, based on a requested content segment length from user device 210, and/or the like. In some implementations, content delivery device 220 can identify a segmentation of the content by server device 230, and can re-segment the content from MPEG-DASH segments to HLS segments. In some implementations, content delivery device 220 can generate a file name for an HLS transport stream file using a pre-configured format to provide information regarding the HLS transport stream file to user device 210. For example, content delivery device 220 can generate a file name, such as "<video file name>~<audio file name>~<time scale>~<duration>~ . . . ", to provide information identifying a video portion of the file, an audio portion of the file, a time scale for the content, a duration for the content, and/or the like to user device 210 to enable playback.

In this way, content delivery device 220 converts the content from the source format to the set of files associated with the target format.

As further shown in FIG. 4, process 400 can include providing the set of files in the target format to a content delivery network (block 450). For example, content delivery device 220 can provide the content in the target format (e.g., to a user device 210, to multiple user devices 210, and/or the like). In this case, content delivery device 220 may provide the content to a content delivery network (e.g., CDN 240) for distribution to one or more user devices 210. In some implementations, content delivery device 220 can provide segments of the content via transmission of a set of files. For example, content delivery device 220 can provide a manifest file associated with the target format (e.g., an HLS manifest file) that identifies video files, audio files, and/or the like of the content. In this case, content delivery device 220 can receive requests for the video files, the audio files, and/or the like from user device 210, and can provide the video files, the audio files, and/or the like. In some implementations, content delivery device 220 can automatically provide the content. For example, based on configuring content streaming, content delivery device 220 can automatically transmit the content to user device 210 to enable playback on user device 210.

In this way, content delivery device 220 provides the content in the target format.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

In this way, content delivery device 220 enables content streaming of MPEG-DASH type content configured for an Android OS-based user device 210 to another, iOS-based user device 210 using HLS. Moreover, content delivery device 220 enables end-to-end digital rights management by decrypting MPEG-DASH-type encryption on the content and encrypting the content with HLS-type encryption. Based on automatically converting the content to provide the content to user device 210, content delivery device 220 enables content streaming without dedicated server devices 230 for each type of user device 210, thereby reducing a utilization of network resources, a utilization of memory resources, a deployment cost, and/or the like.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information provided by individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memories; and
   one or more processors, communicatively coupled to the one or more memories, to:
   receive, from a user device, a request for content in a target format for playback, the content including audio content and video content, and
   the request including first data that identifies the content, the first data being associated with identifying the content in the target format,
   the first data comprising a first manifest identifier that comprises a first string specifying a first video content file name and a first audio content file name;
   parse the first data to identify second data that identifies the content,
   the second data being associated with identifying the content in a source format, and
   the second data identifying the video content file name and the audio content file name;
   determine information identifying the content in the source format based on the second data;
   request the content in the source format using the information identifying the content in the source format;
   receive the content from a content source in the source format based on requesting the content in the source format;
   convert the content in the source format to generate a set of files associated with the target format,
   the set of files including a second manifest identifier that comprises a second string specifying a second video content file name and a second audio content file name; and
   provide the set of files in the target format to a content delivery network associated with the user device.

2. The device of claim 1, where the target format is a hypertext transfer protocol live streaming (HLS) type of format and the source format is a moving picture experts group dynamic adaptive streaming over hypertext transfer protocol (MPEG-DASH) type of format.

3. The device of claim 1, where the user device is configured for playback using the target format and not using the source format.

4. The device of claim 1, where the one or more processors are further to:
   identify a first type of encryption associated with the content and the source format;
   decrypt the content based on identifying the first type of encryption;
   identify a second type of encryption associated with the content and the target format; and
   encrypt the content using the second type of encryption based on identifying the second type of encryption.

5. The device of claim 4, where the one or more processors are further to:
   provide decryption information to the user device to enable the user device to decrypt the content encrypted using the second type of encryption.

6. The device of claim 1, where the one or more processors are further to:
   generate a manifest file associated with the target format to identify the content in the target format; and
   provide the manifest file to the user device,
   the manifest file identifying the set of files.

7. The device of claim 6, where the one or more processors are further to:
   receive a request for a file, of the set of files, of the content based on providing the manifest file,
   the manifest file identifying a plurality of files of the content including the file of the content; and
   where the one or more processors, when providing the set of files, are to:

provide the file based on receiving the request for the file.

8. The device of claim 6, where the one or more processors are further to:
receive another manifest file associated with the source format; and
where the one or more processors, when generating the manifest file, are to:
generate the manifest file based on information included in the other manifest file.

9. A non-transitory computer-readable medium storing instructions, the instructions comprising:
one or more instructions that, when executed by one or more processors, cause the one or more processors to:
receive, from a user device, a request for content in a target format for playback, the content including audio content and video content, and
the request including first data that identifies the content, the first data being associated with identifying the content in the target format,
the first data comprising a first manifest identifier that comprises a first string specifying a first video content file name and a first audio content file name;
parse the first data to identify second data that identifies the content, the second data being associated with identifying the content in a source format, and
the second data identifying the video content file name and the audio content file name;
determine information identifying the content in the source format based on the second data;
request the content in the source format using the information identifying the content in the source format;
receive the content from a content source in the source format based on requesting the content in the source format;
convert the content in the source format to generate a set of files associated with the target format,
the set of files including a second manifest identifier that comprises a second string specifying a second video content file name and a second audio content file name; and
provide the set of files in the target format to a content delivery network associated with the user device.

10. The non-transitory computer-readable medium of claim 9, where the one or more instructions, when executed by the one or more processors, further cause the one or more processors to:
determine a type of the content,
the type being a video-on-demand type of content or a live streaming type of content; and
where the one or more instructions, that cause the one or more processors to determine the information identifying the content, cause the one or more processors to:
determine the information identifying the content based on the type of the content.

11. The non-transitory computer-readable medium of claim 9, where the one or more instructions, that cause the one or more processors to determine the information identifying the content, cause the one or more processors to:
determine the information identifying the content based on determining that the content is stored in the source format by a content source.

12. The non-transitory computer-readable medium of claim 9, where the one or more instructions, when executed by the one or more processors, further cause the one or more processors to:
generate a master playlist file;
generate a media playlist file; and
provide the master playlist file and the media playlist file to the user device to enable content streaming.

13. The non-transitory computer-readable medium of claim 9, where the one or more instructions, when executed by the one or more processors, further cause the one or more processors to:
receive a first manifest file associated with the source format;
parse information included in the first manifest file to determine one or more characteristics of the content;
generate a second manifest file with a second file name to identify the one or more characteristics of the content; and
provide the second manifest file to enable content streaming.

14. The non-transitory computer-readable medium of claim 13, where the one or more instructions, that cause the one or more processors to request the content in the source format, cause the one or more processors to:
transmit information identifying a file name of the content in the source format.

15. The non-transitory computer-readable medium of claim 9, where the user device is configured for playback using the target format and not using the source format.

16. A method, comprising:
receiving, by a device and from a user device, a request for content in a target format for playback,
the content including audio content and video content, and
the request including first data that identifies the content, the first data being associated with identifying the content in the target format,
the first data comprising a first manifest identifier that comprises a first string specifying a first video content file name and a first audio content file name;
parsing, by the device, the first data to identify second data that identifies the content, the second data being associated with identifying the content in a source format, and
the second data identifying the video content file name and the audio content file name;
determining, by the device, information identifying the content in the source format based on the second data;
requesting, by the device, the content in the source format using the information identifying the content in the source format;
receiving, by the device, the content from a content source in the source format based on requesting the content in the source format;
converting, by the device, the content in the source format to generate a set of files associated with the target format,
the set of files including a second manifest identifier that comprises a second string specifying a second video content file name and a second audio content file name; and
providing, by the device, the set of files in the target format to a content delivery network associated with the user device.

17. The method of claim 16, further comprising:
identifying a first type of encryption associated with the content and the source format;
decrypting the content based on identifying the first type of encryption;
identifying a second type of encryption associated with the content and the target format; and
encrypting the content using the second type of encryption based on identifying the second type of encryption.

18. The method of claim 16, further comprising:
providing a manifest file including decryption information to the user device to enable the user device to decrypt the content.

19. The method of claim 16, further comprising:
generating a manifest file associated with the target format to identify the content in the target format; and
providing the manifest file,
the manifest file identifying the set of files.

20. The method of claim 16, further comprising:
receiving a first manifest file associated with the source format;
parsing information included in the first manifest file to determine one or more characteristics of the content;
generating a second manifest file with a second file name to identify the one or more characteristics of the content; and
providing the second manifest file to the user device to enable content streaming.

\* \* \* \* \*